(12) United States Patent
Snow

(10) Patent No.: US 10,200,081 B2
(45) Date of Patent: Feb. 5, 2019

(54) SYSTEMS AND METHODS FOR SIGNAL DETECTION AND DIGITAL BANDWIDTH REDUCTION IN DIGITAL PHASED ARRAYS

(71) Applicant: The United States of America as represented by the Secretary of the Navy, Washington, DC (US)

(72) Inventor: Trevor Snow, Bloomington, IN (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/431,503

(22) Filed: Feb. 13, 2017

(65) Prior Publication Data
US 2017/0324440 A1    Nov. 9, 2017

Related U.S. Application Data

(60) Provisional application No. 62/294,419, filed on Feb. 12, 2016.

(51) Int. Cl.
| H01Q 3/26 | (2006.01) |
| H01Q 3/38 | (2006.01) |
| H01Q 3/40 | (2006.01) |
| H04B 1/66 | (2006.01) |
| H04B 7/0426 | (2017.01) |

(52) U.S. Cl.
CPC ............. *H04B 1/66* (2013.01); *H01Q 3/2658* (2013.01); *H01Q 3/38* (2013.01); *H01Q 3/40* (2013.01); *H04B 7/043* (2013.01)

(58) Field of Classification Search
CPC ...... G01S 7/52036; H04B 7/0408; H04L 5/14
See application file for complete search history.

(56) References Cited

U.S. PATENT DOCUMENTS

| 4,965,602 A | 10/1990 | Kahrilas et al. |
| 5,461,389 A | 10/1995 | Dean |
| 5,541,607 A | 7/1996 | Reinhardt |
| 5,921,932 A * | 7/1999 | Wright ............... G01S 15/8979 600/447 |

(Continued)

*Primary Examiner* — Ross Varndell
(74) *Attorney, Agent, or Firm* — Christopher A. Monsey

(57) ABSTRACT

Methods and systems are provided including a system for signal detection and digital bandwidth reduction in a phased array comprising a digital phased array receiving system, digital beamforming network, and central system-level processing system. In at least one embodiment, a system for signal detection and digital bandwidth reduction in a phased array is provided that includes a digital phased array receiving and transmitting system, a plurality of digital processing nodes, transceivers, and a core processing node, and a plurality of digital beamforming nodes. The exemplary the digital processing nodes including control sections that each perform preprocessing to identify signals with predetermined signal characteristics. The exemplary said preprocessing further includes selecting reflected signals received by the digital phased array receiving and transmitting system having one or more of the predetermined signal characteristics. The selected reflected signals reduced in size and passed to the core processing node with radar data sets.

3 Claims, 4 Drawing Sheets

(56) References Cited

U.S. PATENT DOCUMENTS

| | | | |
|---|---|---|---|
| 8,490,489 B2* | 7/2013 | Randall | G01S 7/52028 |
| | | | 600/446 |
| 2002/0196179 A1* | 12/2002 | Mattox | G01S 13/767 |
| | | | 342/42 |
| 2006/0140291 A1* | 6/2006 | Thomas, Jr. | H04L 27/265 |
| | | | 375/260 |
| 2008/0025614 A1* | 1/2008 | Hintz | G01S 7/411 |
| | | | 382/189 |
| 2011/0260908 A1* | 10/2011 | New | G01S 7/023 |
| | | | 342/59 |
| 2013/0201054 A1* | 8/2013 | Wang | G01S 13/0218 |
| | | | 342/93 |

* cited by examiner

SYSTEMS AND METHODS FOR SIGNAL DETECTION AND DIGITAL BANDWIDTH REDUCTION IN DIGITAL PHASED ARRAYS

CROSS-REFERENCE TO RELATED APPLICATIONS

The present application claims priority to U.S. Provisional Patent Application Ser. No. 62/294,419, filed Feb. 12, 2016, entitled "SYSTEMS AND METHODS FOR SIGNAL DETECTION AND DIGITAL BANDWIDTH REDUCTION IN DIGITAL PHASED ARRAYS," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,348) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to systems and methods for various digital phased array and beamforming architectures that have a reduced need for digital bandwidth while maintaining the probability of detection and probability of false alarm of a traditional digital beamforming phased array.

Actively scanned phased arrays can use a multitude of antenna elements and phase shifting mechanisms to change the inbound signal phase, along with a summing network, to electronically form or scan a receive beam or set of beams for the overall phased array. This is often done within the analog domain with discrete phase shifter components, waveguides, and power combination circuits. Output of this analog beam former can be digitized and sent to a signal processor for signal detection. To form multiple receive beams, complete sets of phase shifters and waveguides are often necessary for each additional beam, adding to cost and weight.

Digital phased arrays can be designed to address such limitations where digitization occurs at an output of each subarray or even each antenna element receiver in the system. Samples from each digital channel can be weighted by a multiplier to adjust phase and amplitude and are then summed together, forming a digital receive beam signal defined by these weights and the distribution of antenna elements on the array. Multiple digital receive beams are formed by generating separate streams for each set of weights for each desired beam. Signal detection is done at the final summation point for these beams, depending on the application of the system. For radar systems, one goal can be to detect echo return pulses sent out earlier. Such detection can be done digitally by applying a matched filter to each receive beam and then running the resulting signal through a threshold detector, where crossings at particular time samples correspond to targets at a certain range or false detections due to noise.

Digital beamforming arrays must transport digitized sample data to other locations for summing and forming final receive beams. This is accomplished by a number of different architectures. A central summer can take in all samples from every stream and form any number of digital beams, limited only by the amount of processing power available. For very large arrays, a processor of this nature would require an enormous amount of digital input bandwidth and input connections.

A hierarchical beam former takes a layered approach by summing beam data from each digital channel at multiple tiers, reducing the amount of data into the final central processor. Hierarchical and other networked digital beamforming architectures are very dependent on the amount of digital bandwidth available between summation nodes and this digital bandwidth limits the total beam-bandwidth product. Various systems can either produce a large number of beams each with smaller sample rate, or a small number of beams each with a large sample rate.

Processing at each node is available in these architectures that can be adapted to add additional computational power than adding excess digital input/output (I/O) bandwidth. By pulling some of the signal detection processing that occurs at the final processor in a pulse-detecting system into each node for pre-processing, an amount of digital sample data that must be sent to the final processor can be greatly reduced. Embodiments of the invention can include an exemplary capability that can expand the amount of achievable beam-bandwidth for a fixed amount of digital I/O available between hierarchical beamforming nodes or would reduce the needed digital I/O capacity of a digital phased array. Embodiments of the invention can include an architecture that provide an ability for implementing signal predetection in digital phased arrays with distributed signal processing, and by using a hybrid detection methodology that combines binary integration and standard coherent processing at final beamforming nodes, digital I/O capacity needs are reduced while maintaining detection sensitivity of a standard coherent phased array architecture.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
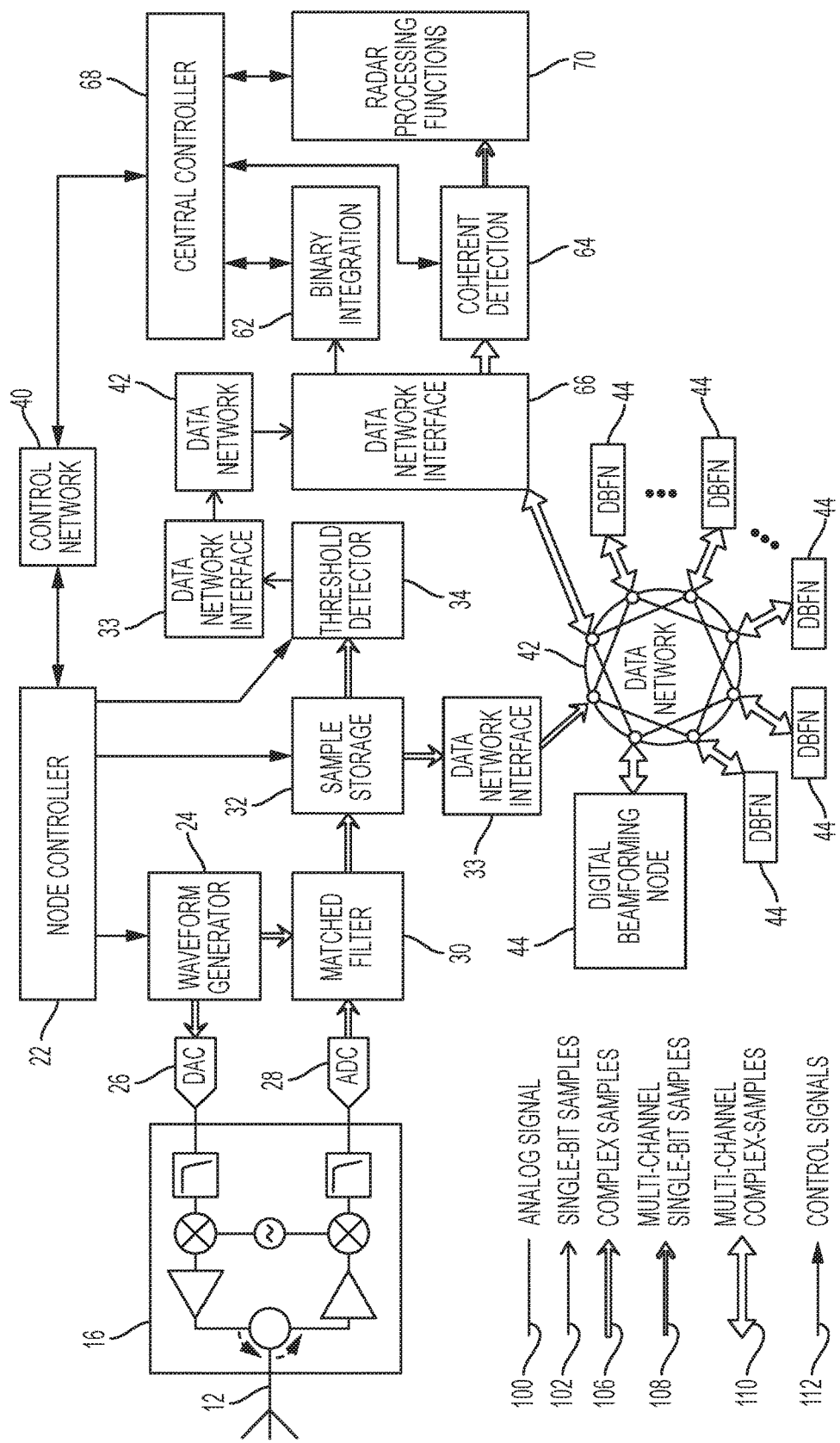
FIG. 1 shows a more simplified description of an exemplary embodiment architecture that can include a digital phased array receiving system, digital beamforming network, and central system-level processing.

The embodiments of the invention described herein are not intended to be exhaustive or to limit the invention to precise forms disclosed. Rather, the embodiments selected for description have been chosen to enable one skilled in the art to practice the invention.

For a simple phased array radar system, digitization and matched filtering for pulse compression can be applied at an output of a beam former. Constant false alarm rate (CFAR) thresholding can be applied to an output of the matched filter and detections are declared at threshold crossings. In an alternative embodiment, a digital beamforming network can be assumed to have some amount of processing available at the output of each analog-to-digital converters (ADC) or local group of ADCs, where preliminary beamforming may occur. Matched filtering can be applied at or just after the first stage of digital beamforming at an elemental or subarray level. This is possible due to the distributive property of convolution of filtering on the overall array factor and thus matched filtering can be applied prior to the final summation digital beamforming network.

In one embodiment, applying matched filtering in such a manner increases the amount of processing that must be done in a distributed manner across an array, requiring additional fast-Fourier transform (FFT)/inverse fast-Fourier transform (IFFT) processing at each node. A need for this feature in various situations is called for in digital phased array systems for fine control of calibration and phase versus frequency to mitigate beam squint. For a digital phased array with elemental digitization, matched filtering could be applied prior to any beam weighting rather than to each sample stream per beam. This embodiment uses preprocessing at each node to obtain data on where targets of interest likely exist in a particular configuration of targets and interference around a digital phased array radar system, then sends a smaller subset of digital data to a central processor than what would be required of a traditional digital phased array radar system, while retaining desired probability of detection and other pertinent performance parameters as compared to a traditional system, and in doing so, achieves a reduction of I/O capacity needs versus a traditional system.

In various embodiments, matched filtering and threshold detection earlier in the beam former means that signal to noise ratio (SNR) is much lower than typical for radar systems. A three-threshold detection process enables detection sensitivity comparable to standard coherent radar. Binary integration looks at N measurements and if M detections are measured, a detection is declared. Where aspects of some embodiments of the invention might more typically be applied to a few distributed radar sensors, or a data fusion of multiple disparate sensors, in this embodiment it can be applied widely across all the digital nodes on a phased array. A number of sensors in at least some embodiments may range from tens to multiple thousands for an array with elemental digitization. While exemplary detection methodologies or systems by themselves offers greatly reduced data transport requirements—a single bit per beam, per range cell, per node—it suffers a sensitivity penalty or reduced probability of detection for a given input SNR. This sensitivity penalty can be avoided in at least some exemplary embodiments by commanding all nodes to forward only range bin samples where binary integration detections were declared. In some exemplary embodiments, a first threshold at each node and binary M-of-N threshold can be set to ensure the probability of detection for a given target SNR is being met, which results in a high false alarm rate. Minimizing the false alarm rate reduces the amount of samples that must be sent downstream for beamforming, where more traditional threshold detection occurs and detection sensitivity for that cell ideally matches that of a standard coherent digital beam former.

Referring to FIG. 1, a simplified description of an exemplary embodiment is shown that can include a digital phased array transmitting and receiving system, digital beamforming network, and signal processing. A waveform generator 24 creates a digital pulse waveform, which is sent to a digital-to-analog converter (DAC) 26 or group of DACs that converts the digital pulse waveform into an analog signal. The analog signal is then sent to a transceiver 16 that converts and amplifies the analog signal for transmission out of a connected antenna element 12. Received signals from transceiver elements are converted to a valid input range for a set of analog-to-digital converters (ADC) 28. Digital samples from each ADC 28 are transmitted to a matched filter circuit 30 that applies pulse compression to maximize signal to noise ratio if a reflected transmit pulse is in a signal received by the transceiver 16, and stores the result in a sample storage circuit 32. A threshold detector 34 pulls the time sample outputs from the sample storage 32 and logs which time samples exceed a threshold. A data word indicator of which time samples exceeded the threshold is sent to a binary integration circuit 62 which receives similar indicators from other threshold detectors in other digital nodes not depicted in FIG. 1. The binary integration circuit 62 counts detections in each time sample across all received indicators and declares a binary integration detection if the count exceeds another different threshold. A central controller 68 requests filtered complex sample data from each sample storage circuit in each digital node for each time sample with a binary integration detection. The filtered complex sample data is sent through a network of connected digital beamforming nodes 44 which apply weights to the filtered complex sample data and sum weighted data to form a number of electronically scanned receive beam data channels that correspond to signals received by an array (not depicted in FIG. 1) of transceivers 16 and connected antennas 12.

A system-level coherent detection circuit 64 applies a new threshold detection to each sample on each received beam channel, whose signal to noise ratio (SNR) is now increased or decreased if a signal is present and its direction of arrival corresponds to a high or low gain direction of an electronically scanned receive beam. The coherent detection circuit 64 applies threshold detection to samples in each received beam data channel and coherent detections exceeding a specified magnitude are sent to a radar processing function element 70 for higher level processing.

Figure 2:
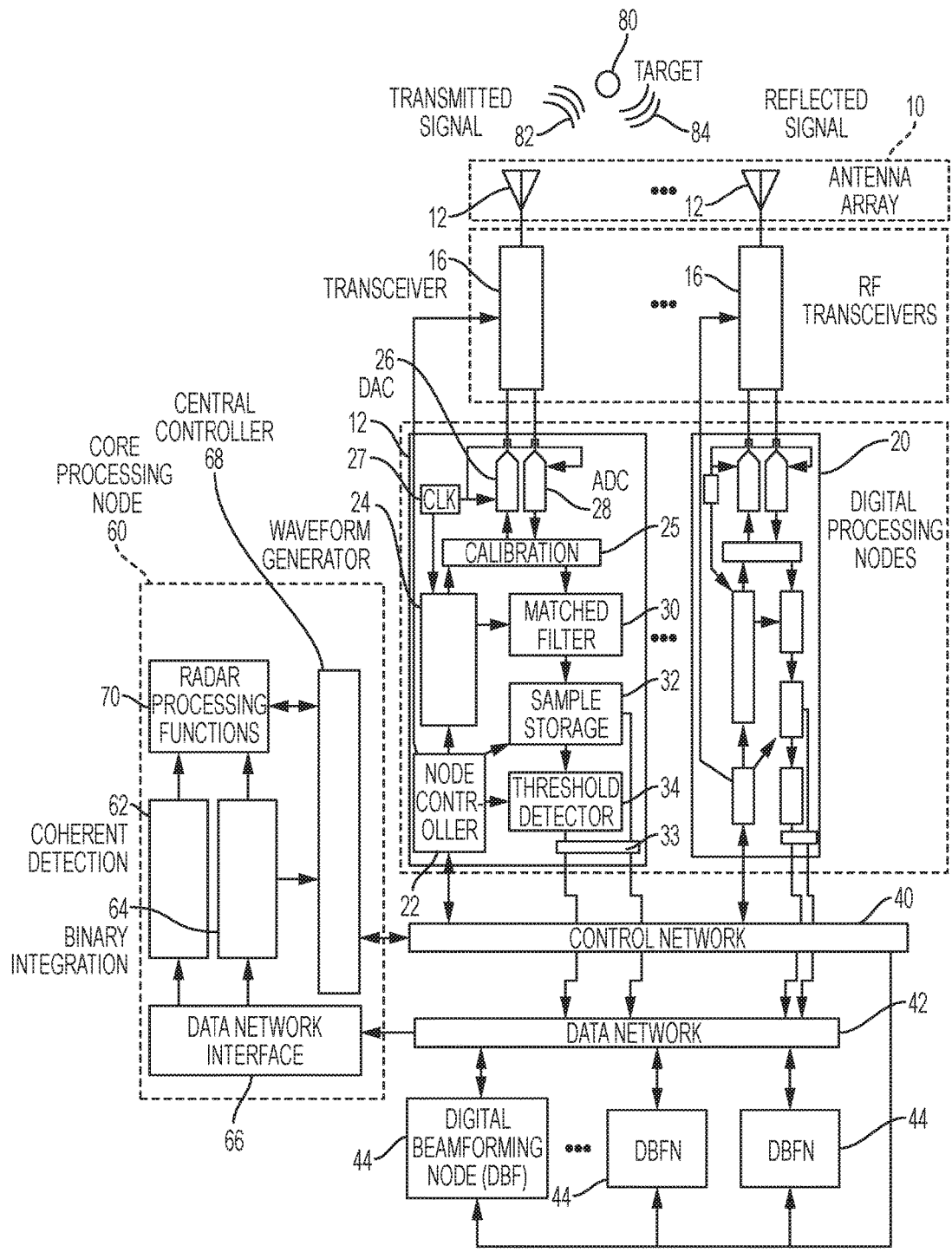
FIG. 2 shows a more detailed description of the FIG. 1 general exemplary embodiment architecture.

Referring to FIG. 2, a more detailed description of the FIG. 1 general description is provided. In particular, FIG. 2 shows an exemplary digital phased array radar system that includes a core processing node 60 that is bi-directionally coupled with a control network 40 and a data network 42. The data network 42 is further coupled via a number of separate signal busses with a number of digital beamforming nodes (DBFN) 44 (two are shown but there are a number of them, e.g., one digital processing node 20 for each transceiver) and a number of digital processing nodes 20. The digital processing nodes 20 are further coupled via a number of separate signal busses to the data network 42 and control network 40. Each digital processing node 20 is further individually coupled via a number of separate signal busses to a number of radio-frequency (RF) transceivers 16, which are each further connected to a number of antenna elements 12 in an antenna array 10.

The core processing node 60 includes a central controller 68, a coherent detection circuit 62, a binary integration circuit 64, a radar function processor 70, and a data network interface 66. The central controller 68 residing in the core processing node 60 initiates a transmit-receive cycle based on inputs from a source (not shown) where the transmit-receive cycle includes selecting a pulse waveform to use within a next transmit-receive cycle, a desired transmit beam pattern, and a desired set of receive beams that will fall within the transmit beam pattern. The central controller 68 then sends a waveform configuration command that includes waveform parameters to all digital processing nodes 20 connected within the radar system via the control network 40. The waveform parameters include pulse width, center frequency, waveform modulation parameters, and transmit beam steering weights.

The digital processing nodes 20 include a node controller 22, which are coupled via signal busses to a waveform generation circuit 24, sample storage memory 32, and a threshold detector 34. The waveform generator 24 is coupled via signal busses to a calibration circuit 25 which is further coupled via signal busses to a digital-to-analog converter (DAC) 26, an analog-to-digital converter (ADC) 28, and a matched filter circuit 30. The matched filter circuit 30 is coupled via signal busses to a sample storage memory 32, which is further coupled via signal bus to a threshold detector 34. Both the sample storage memory 32 and threshold detector 34 are coupled via signal bus to a data network interface 33.

The node controller 22 at each digital processing node 20 accepts the waveform configuration command from the central controller 68 and passes the pulse waveform parameters to the waveform generator 24. The waveform generator 24 creates frequency (F(s)) pulse width (PW) digital samples of the pulse waveform, based on the parameters given to it, where Fs is the rate of the sample clock 27 provided to the digital-to-analog converter (DAC) 26 and waveform generator 24, and PW is a pulse width of the pulse waveform, resulting in an integer number of time samples. The waveform generator passes the generated digital samples of the pulse waveform to the matched filter circuit 30, which the matched filter circuit 30 will later use as a reference copy of the pulse waveform for receive pulse compression operations, described later herein. The waveform generator 24 also applies appropriate phase and amplitude adjustments necessary to form the desired pulse waveform and transmit beam based on the waveform parameters. Digital samples generated by the waveform generator 24 form a digital sample waveform, which can include two streams of digital sample outputs—one for a real component of the pulse waveform signal and another for an imaginary component of the pulse waveform signal—or a single stream of real-valued samples of the pulse wave form signal. Each digital sample in each stream includes a number of bits, nDAC, equal to a number of bits of each DAC 26 connected to outputs of the waveform generator 24. The digital sample waveform is then passed to a calibration circuit 25 which applies further phase and amplitude adjustments to the digital sample waveform to correct for variations within a transmit path (e.g., DAC, transceiver) and mutual coupling between elements. The corrected digital sample waveform is then sent to one or more DACs 26 (e.g., a DAC 26 to address real samples and another DAC to address imaginary samples or a single DAC 26 for just real samples), which convert their nDAC-bit digital inputs into an analog signal and then each DAC 26 respectively outputs a resulting analog signal to a respective one of the RF transceivers 16.

A transmitter portion of each of the RF transceivers 16 converts the analog signal (e.g., a low-frequency analog signal) or signals up to the desired pulse waveform center frequency as a converted analog signal, amplifies the converted analog signal, and provides each of the amplified converted analog signals to a respective attached antenna element 12. The transmitter portion's circuitry architecture can be designed in a variety of ways provided it accomplishes function described herein. The transmitter portion could be a zero-intermediate-frequency (zero-IF) architecture, meaning it converts two real-valued analog signals representing the real and imaginary components of a baseband signal directly to the desired radio-frequency or indirectly through multiple other frequencies. If not a zero-IF architecture, the transmitter could operate as a traditional heterodyne architecture, converting one analog signal input up to a desired radio-frequency. The number of analog inputs required by the transmitter, either one or two, dictates the number of DACs 26 required and corresponding complexity of the waveform generator 24 and calibration circuit 25.

With exemplary or suitable phase and amplitude adjustments applied to the pulse waveform at each transceiver 16, resulting radiated signals 82 from each antenna element 12 coherently combine to form a transmit beam. Any type of transmit beam is viable, but for this digital phased array system, a fan beam provides a significant degree of utility.

Reflected pulses 84 from targets 80 and clutter return to the antenna array 10 and enter individual RF transceivers 16. The receiver portion within the transceivers 16 amplifies and converts the reflected signals 84 to baseband signals having an input frequency range of connected ADC(s) 28, depending on if a particular transceiver 16 is configured for real and imaginary baseband signals or simply a real baseband signal. The ADCs 28 digitize the baseband signals and provide nADC-bit digitized baseband signal outputs at a sample rate of Fs to the calibration circuit 25, which corrects for errors in a given receiver chain (e.g., transceiver 16, ADC 28 along with connected busses).

At this point a more traditional digital phased array system similar to the system depicted in FIG. 2 would apply a phase and amplitude weights or time delays to the received signal at each digital processing node 20 to begin a digital beamforming operation, forming output data streams of samples, which are elements of a single receive beam or of multiple receive beams. The traditional system would sum these outputs to form final digital output signal for each receive beam. For a pulse-Doppler type of radar system, the system would pass the receive beam data through a matched filter corresponding to the transmit pulse to improve signal strength and accomplish pulse compression.

It is possible to reorder these processes since the matched filtering operation is mathematically distributable to the product terms within the beamforming summation. In the proposed system, the calibration circuitry 25 passes the corrected digitized baseband signal outputs to a matched filter circuit 30. The matched filter circuitry 30 computes a convolution operation with the reference copy of the pulse waveform and the received signal from the calibration circuitry 25. A potential method for this process would involve first taking the fast-Fourier transform (FFT) of the received signal and multiplying it with the FFT of the reference pulse waveform in the frequency domain, then performing the inverse FFT on the result to generate a complex-valued filtered time-domain signal.

The output from the matched filter 30 is then passed into a sample storage 32 block, which places samples of the complex-valued filtered time-domain signal from the matched filter 30 into memory. The sample storage 32 memory must store at least enough samples to capture the entire receiving time window of the radar system, which includes a portion of time between a transmit pulse and a subsequent transmit pulse. For this configuration, let the number of received samples be L, forming a sample sequence vector, where the samples are arranged in a configuration. A potential configuration relates the first vector element in the sequence to signals received by the antenna array 10 at a time index of zero, every subsequent contiguous vector element to signals received by the antenna array 10 at monotonically increasing increments of time of size 1/Fs, and the last vector element L to signals received by the antenna array at a time index of (L−1)/Fs. All configurations of length-L vectors derived the sample sequence vector retain the same time-sequence relationship between vector elements as the sample sequence vector.

The sample storage circuit 32 passes the L complex time-domain samples to a threshold detector circuit 34, or alternatively the output of the matched filter 30 is multiplexed directly to the threshold detector circuit 34 and simultaneously to sample storage 32. The threshold detector 34 first computes the magnitude of each of the L complex-valued filtered time-domain samples and then compares this value to a threshold γ, producing a single-bit indicator sample output for each input sample, with a one indicating the sample magnitude exceeded the threshold γ and a zero if it did not. The threshold detector 34 then produces an indicator vector including the L single-bit indicator samples, retaining the time-sequence relationship of input samples to the threshold detector 34, and sends the indicator vector to a connected data network interface 33. The data network interface 33 prepares and sends the indicator vector to the core processing node 60 via the data network 42. The core processing node 60 collects indicator vectors from all N digital processing nodes 20 via its own data network interface 66. The collected indicator vectors are sent to the binary integration circuitry 64, which counts the number of positive threshold detections for each of the L samples in the N vectors. A method for counting detections includes counting the occurrences of a one-value in the first time-index of L indicator samples across all N indicator vectors and storing the resulting count value in a data register, then iterating these steps for the 2nd through L-th time indices of indicator samples with a new data register on each iteration. A resulting group of data registers forms a new length-L binary count vector, which retains the same time-sequence relationship between vector elements as the individual length-L indicator vectors.

The binary integration circuit 64 compares the count value at each of the L samples in the count vector to an integer threshold M, then produces a single-bit binary detection indicator with a value of one where the count values exceed the threshold M and a zero elsewise. The binary detection indicators form a length-L binary detection indicator vector, which retains the same time-sequence relationship between vector elements as the count vector. In plain terms, if enough of the digital processing nodes 20 have detected a reflected pulse at a particular time index, the entire system declares a binary detection for that time index. The number of binary detections, K, is the number of one-valued members in the binary detection indicator vector. Methods for setting the thresholds M and γ include encoding the values as an initial design parameter, or adaptively modifying the thresholds during operation, for a desired probability of detection, Pd, and a probability of false alarm, Pfa. However, in setting the parameters for a desired Pd, the resulting Pfa at the output of the binary integration circuit 64 is higher than typically desired for an operational system. The binary integration detection process has reduced sensitivity compared to a traditional coherent beamforming and detection process, where digital beamforming is applied first to samples received across an array, then matched filtering and threshold detection is applied. Also, spatial filtering typically applied by a beamforming operation has not been applied, such that the signals received and detected at each digital processing node 20 are possibly reflected from anywhere in a wide angular space, due to the typically wide antenna patterns of individual elements in a phased array.

To restore sensitivity, a third detection process is applied. The binary integration circuitry 64 sends the binary detection vector to the central controller 68. The central controller 68 processes this information and then sends a command to each node controller 22 via the control network 40, which includes a request for beam formed complex-valued filtered time-domain samples for the time indices related to the K one-valued elements in the binary detection vector, as well as p time-leading and p time-lagging beam formed complex-valued filtered time-domain samples adjacent to the K samples just requested, for a total amount of requested samples equal to K(1+2p), assuming no overlap of the time-leading or time-lagging sample window between the K samples. The node controller 22 in each digital processing node 20 commands its connected sample storage 32 to forward complex-valued filtered time-domain samples related to the request received from the central controller 68. The sample storage 32 sends the related complex-valued filtered time-domain samples to a digital beamforming node (DBFN) 44 connected through the data network 42. In a configuration of the digital phased array radar system with a singular DBFN 44, the DBFN 44 receives K(1+2p) complex-valued filtered time-domain samples from each of the N digital processing nodes 20. A procedure for digital beamforming includes operations where, for the first of B receive beam channels, the DBFN 44 applies a first set of phase and amplitude adjustments related the first beam channel to the K(1+2p) samples received from the first of N digital processing nodes 20, forming a time-indexed vector of product terms for the first receive beam channel from the first digital processing node. The DBFN 44 iterates this process for each digital processing node and for each beam channel, forming a product term data matrix for each receive beam channel with a time dimension for the K(1+2p) samples, and a spatial dimension for the N digital processing node 20 sources. The DBFN 44 sums the product term data matrix for each receive beam channel across the spatial dimension, forming a receive beam data vector consisting of K(1+2p) beam formed complex-valued filtered time-domain samples, then forming a set of B receive beam data vectors from the individual receive beam data vectors. The DBFN 44 transmits the set of receive beam data vectors to the coherent detection circuitry 62 in the core processing node 60 via the data network 42. In a configuration of the digital phased array radar system with multiple DBFN 44, each DBFN 44 receives a subset of the complex-valued filtered time-domain samples from the N digital processing nodes 20. A procedure for digital beamforming includes operations similar to the aforementioned procedures for the singular DBFN configuration, except that the product term matrix is distributed across a portion of the DBFNs 44, the summation operations of the product term data matrix are distributed across the DBFNs 44 by exchanging partially summed portions of the product term data matrix through the data network 42, the set of receive beam data vectors are stored in a distributed manner across the DBFNs 44, and the set of receive beam data vectors are transmitted from their distributed locations to the coherent detection circuitry 62.

The coherent detection circuitry 62 applies a threshold detection operation to the K to beam formed complex-valued filtered time-domain samples where detections were declared in the binary integration detection process. A coherent detection threshold parameter α is dynamically configured based on the p time-leading and p time-lagging samples on either side of the binary integration detection sample under test, as well as system design level parameters in conjunction with the thresholds γ and M, to ensure the digital phased array system has a desired Pd and constant false alarm rate (CFAR) using industry standard statistical methods. The coherent detection circuitry 62 declares a system-level detection if the binary integration detection sample under test exceeds the threshold parameter α then passes the positive system-level detections to a radar processing function block 70 for higher level radar processing, such as tracking.

Figure 3A:
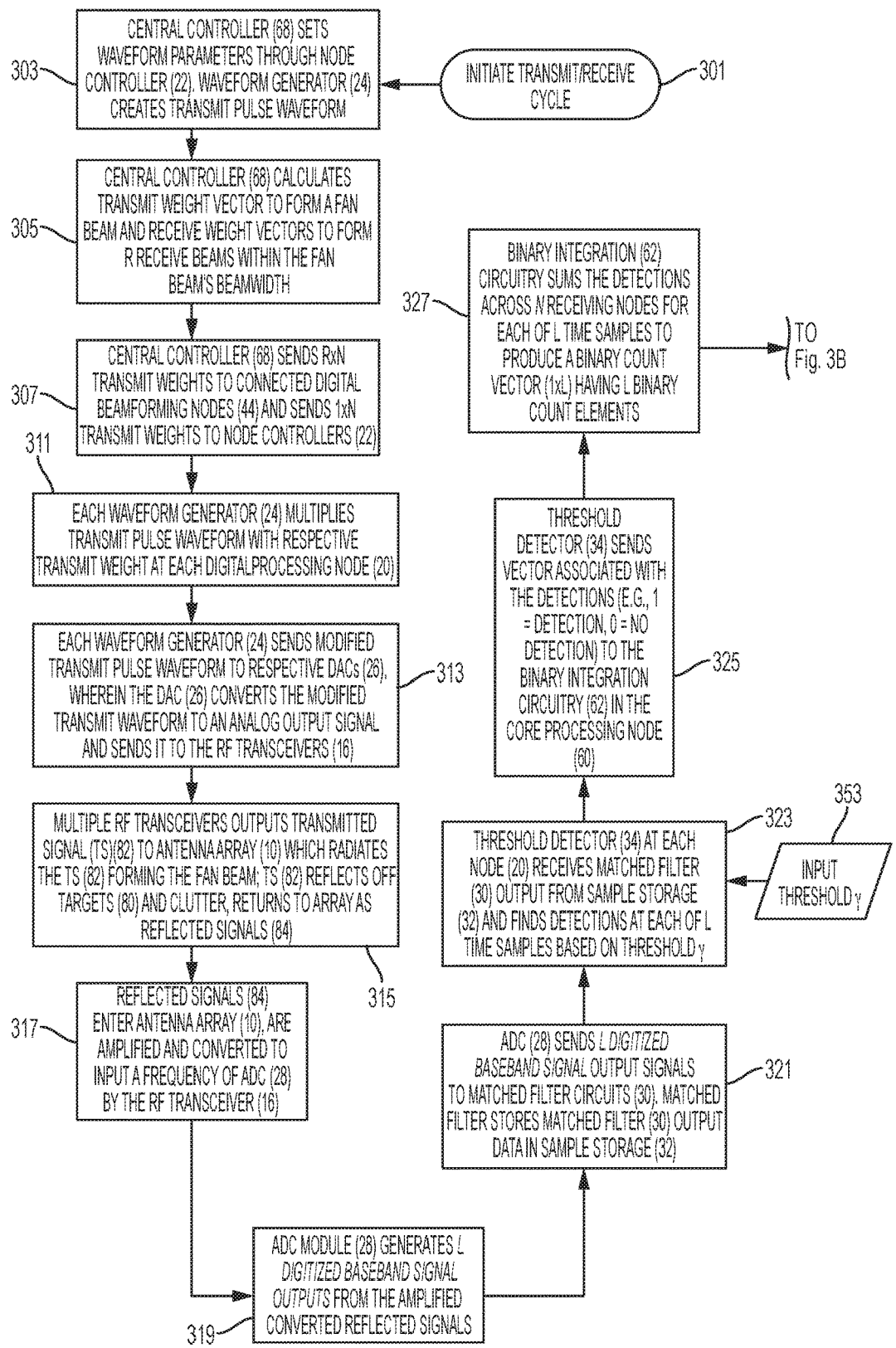
FIG. 3 shows an exemplary method associated with one embodiment of the invention using the FIG. 1 or 2 exemplary embodiments.
Figure 3B:
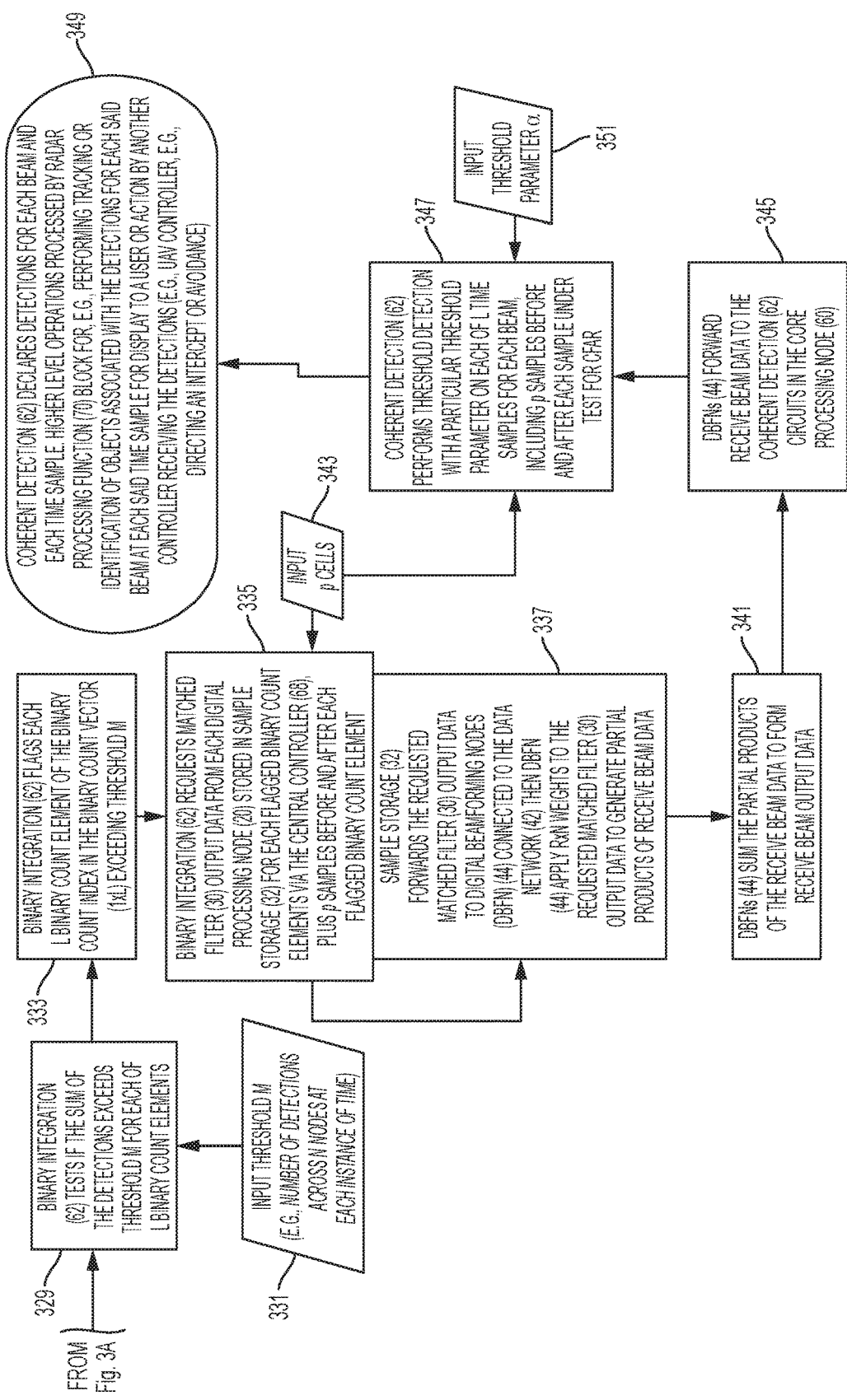

Referring to FIG. 3, at step 303: Central Controller (68) sets waveform parameters through Node Controller (22). Waveform Generator (24) creates transmit pulse waveform. At Step 305: Central Controller (68) calculates transmit weight vector to form a fan beam and receive weight vectors to form R receive beams within the fan beam's beam width. At Step 307: Central Controller (68) sends R×N transmit weights to connected digital beamforming nodes (44) and sends 1×N transmit weights to Node Controllers (22). At Step 311: Each Waveform Generator (24) multiplies transmit pulse waveform with respective transmit weight at each Digital Processing Node (20). At Step 313: Each Waveform Generator (24) sends modified transmit pulse waveform to respective DACs (26), wherein the DAC (26) converts the modified transmit waveform to an analog output signal and sends it to the RF Transceivers (16). At Step 315: Multiple RF Transceivers outputs Transmitted Signal (TS) (82) to Antenna Array (10) which radiates the TS (82) forming the fan beam; TS (82) reflects off Targets (80) and clutter, returns to array as reflected signals (84). At Step 317: Reflected Signals (84) enter Antenna Array (10), are amplified and converted to input a frequency of ADC (28) by the RF Transceiver (16). At Step 319: ADC Module (28) generates L digitized baseband signal outputs from the amplified converted reflected signals. At Step 321: ADC (28) sends L digitized baseband signal output signals to Matched Filter circuits (30). Matched Filter stores matched filter (30) output data in Sample Storage (32). At Step 323: Threshold Detector (34) at each node (20) receives Matched Filter (30) output from Sample Storage (32) and finds detections at each of L time samples based on Threshold γ after Step 353: Input Threshold γ for use in Step 323. At Step 325: Threshold Detector (34) sends vector associated with the detections (e.g., 1=detection, 0=no detection) to the Binary Integration circuitry (62) in the Core Processing Node (60). At Step 327: Binary Integration (62) circuitry sums the detections across N receiving nodes for each of L time samples to produce a binary count vector (1×L) having L binary count elements. At Step 329: Binary Integration (62) tests if the sum of the detections exceeds Threshold M for each of L binary count elements based after Step 331: Input Threshold M (e.g., number of detections across N nodes at each instance of time). At Step 333: Binary Integration (62) flags each L binary count element of the binary count index in the binary count vector (1×L) exceeding Threshold M. At Step 335: Binary Integration (62) requests matched filter (30) output data from each Digital Processing Node (20) stored in Sample Storage (32) for each flagged binary count elements via the Central Controller (68), plus p samples before and after each flagged binary count element after input at Step 343: Input p cells. At Step 337: Sample Storage (32) forwards the requested matched filter (30) output data to Digital Beamforming Nodes (DBFN) (44) connected to the Data Network (42) then DBFN (44) apply R×N weights to the requested matched filter (30) output data to generate partial products of receive beam data. At Step 341: DBFNs (44) sum the partial products of the receive beam data to form receive beam output data. At Step 345: DBFNs (44) forward receive beam data to the Coherent Detection (62) circuits in the Core Processing Node (60). At Step 347: Coherent Detection (62) performs threshold detection with a particular threshold parameter on each of L time samples for each beam, including p samples before and after each sample under test for CFAR after input at Step 343: Input p cells; as well as after input at Step 351: Input Threshold parameter α. At Step 349: Coherent Detection (62) declares detections for each beam and each time sample. Higher level operations processed by Radar Processing Function (70) block for, e.g., performing tracking or identification of objects associated with the detections for each said beam at each said time sample for display to a user or action by another controller receiving the detections (e.g., UAV controller, e.g., directing an interceptor avoidance).

Various advantages of various embodiments of the invention are provided. Since the signals present in space for most pulse detection systems are sparse in time for applications such as radar, sonar, or other pulse detection systems, only a few of time samples globally detected by the binary integration circuit will contain real targets, some samples will be false detections, and some time indices will have no detection declared. This advantage plus a combination of the binary integration detection, then beamforming, then and standard coherent detection, allows for a reduction in the total amount of sample data that must be sent through the digital beamforming network compared to a traditional digital phased array. The detection thresholds at each digital node and at the binary integrator can be tailored to ensure a desired probability of detection for the most difficult to detect signal, which then sets the intermediate false alarm rate of the binary integrator. This intermediate false alarm rate—dependent on element patterns, subarray patterns, thermal noise, and the clutter environment—dictates the digital I/O bandwidth necessary to transmit pre-detected samples up to the coherent detector. The desired system false alarm rate will typically be much lower than this intermediate false alarm rate and the addition of the top level coherent detector, having a different detection threshold, is used to reject false detections from the binary integration detection.

Some embodiments of the invention can decrease an impact of a digital I/O bottle neck that would limit the number of beams or amount of analog signal bandwidth per beam and can increase the amount of space and spectrum scanned by a phased array system. Digital phased array radar apertures would benefit from various embodiment architectures, enabling faster scanning times of the 3-D volume around the radar.

Although the invention has been described in detail with reference to certain preferred embodiments, variations and modifications exist within the spirit and scope of the invention as described and defined in the following claims.

The invention claimed is:

1. A system for signal detection and reduction of digital bandwidth into a digital beamformer, comprising:
   a digital phased array receiving and transmitting system;
   a plurality of digital processing nodes and transceivers;
   a core processing node, and
   a digital beamformer comprising at least one digital beamforming node;

wherein said digital processing nodes including control sections that store digitized received signals and perform a pre-detection process on digitized received signals with predetermined signal characteristics to form detection indicators with respect to time samples and based on a first threshold;

wherein said core processing node further comprises a binary integration circuit that counts said detection indicators from said digital processing nodes with respect to time to form a binary count vector, wherein said binary integration circuit compares said detection indicators to a second threshold, said binary integration circuit requests said stored digitized receive signals from said digital processing nodes within a predetermined time window before or after time samples passing the said second threshold; and requested digitized receive signals are forwarded to said digital beamforming network, wherein said at least one digital beamforming node forms receive beam output data from said digitized receive signals.

2. A digital phased array system including a system for engaging in signal detection and reduction of digital bandwidth into a digital beamformer, comprising:
   a core processing node;
   a control network;
   a transceiver section comprising a plurality of transceiver elements; and
   a digital phased array transmitting and receiving system comprising a digital beamforming network and a signal processing section, the digital phased array and receiving system further comprises a plurality of connected digital beamforming nodes each comprising a waveform generator, a digital-to-analog-converter (DAC) or group of DACs, a set of analog-to-digital converters (ADC), a matched filter circuit, a sample storage circuit, a threshold detector, a binary integration circuit, a system-level coherent detection circuit, and a radar processing function element;
   wherein the digital beamforming and signal processing section's waveform generator creates a digital pulse waveform that is sent to the DAC or group of DACs that converts the digital pulse waveform into an analog signal, the analog signal is then sent to the transceiver that converts and amplifies the analog signal for transmission out of a connected antenna element;
   wherein received signals from one or more transceiver elements are converted to a valid input range for said set of said analog-to-digital converters (ADC);
   wherein digital samples from each ADC are transmitted to said matched filter circuit that applies pulse compression to maximize signal to noise ratio if a reflected transmit pulse is in a signal received by the transceiver and stores the result in the sample storage circuit;
   wherein the threshold detector extracts time sample outputs from the sample storage and logs which time samples exceed a threshold, wherein a data word indicator of which time samples exceeded the threshold is sent to the binary integration circuit which receives similar indicators from other said threshold detectors in other digital beamforming nodes;
   wherein the binary integration circuit counts detections in each time sample across all received indicators and declares a binary integration detection if the count exceeds another different threshold;
   wherein a central controller requests filtered complex sample data from each sample storage circuit in each digital node for each time sample with a binary integration detection;
   wherein the filtered complex sample data is sent through the network of connected digital beamforming nodes which apply weights to the filtered complex sample data and sum weighted data to form a number of electronically scanned receive beam data channels that correspond to signals received by an array of transceivers and connected antennas in said digital array;
   wherein the system-level coherent detection circuit applies a new threshold detection to each sample on each received beam channel whose signal to noise ratio (SNR) is now increased or decreased if a signal is present and its direction of arrival corresponds to a high or low gain direction of an electronically scanned receive beam, wherein the coherent detection circuit applies threshold detection to samples in each received beam data channel and coherent detections exceeding a specified magnitude are sent to a radar signal processing section.

3. A digital phased array transmitting and receiving system for signal detection and reduction of digital bandwidth into a digital beamformer, comprising:
   an array of antenna elements;
   one or more transceivers;
   one or more digital processing nodes;
   a core processing node, and
   a digital beamformer comprising at least one digital beamforming node;
   wherein said transceivers are coupled to said one or more digital processing nodes and one or more antenna element of said array of antenna elements, and are configured to amplify received signals and transmit signals between said coupled one or more digital processing nodes and said coupled one or more antenna elements;
   wherein said one or more digital processing nodes include one or more analog to digital converter (ADC) modules that are selectively coupled to one of the one or more transceivers transceiver and are configured to convert said received signals to sampled received signals and sampled transmit signals to transmit signals;
   wherein said one or more digital processing nodes include a filter circuit coupled to said ADC configured to amplify said sampled received signals having predetermined signal characteristics and adapted to perform matched filtering on said sampled receive signals;
   wherein said one or more digital processing nodes include a sample storage circuit configured to store said sampled receive signals when coupled to said ADC modules, and configured to store outputs from said filter circuit when coupled to said filter circuit;
   wherein said one or more digital processing nodes further include a threshold detection module configured to analyze one or more signal parameters of said sampled received signals and determine if said signal parameters of said received signals exceed a first threshold for each of the one or more signal parameters on a prescribed time interval, forming positive first threshold detection indicators for each said signal parameter exceeding the associated said first threshold for said time sample within a sequence of time samples;
   wherein said control node includes a binary integration circuit which is coupled to said threshold detection modules through a data network and is configured receive said first threshold detection indicators from said first threshold detectors and also configured to form a count of the occurrences of positive first threshold detection indicators across one or more said threshold detection modules for each said time sample within said sequence of time samples;

wherein said binary integration circuit is further configured to perform a second threshold detection based on said count and one or more second threshold parameters, forming a binary detection indicator for each said count passing the said second threshold detection at each said time sample;

wherein said binary integration circuit is further coupled to a central controller configured to process said binary detection indicators and send request commands for said stored receive signal data to a coupled node controller within each of the said one or more digital processing nodes via a control network;

wherein said at least one digital beamforming node is coupled to said sample storage circuits via a data network and are configured to receive said requested stored receive signal data and further apply digital weights to form receive beam output data from stored receive signal data.

* * * * *